(12) United States Patent
Way et al.

(10) Patent No.: US 8,022,169 B2
(45) Date of Patent: Sep. 20, 2011

(54) ALIPHATIC COPOLYESTERS AND METHOD OF PREPARING THE SAME

(75) Inventors: Tun-Fun Way, Hsinchu (TW); Jiun-Jy Chen, Miaoli County (TW); Lien Tai Chen, Taoyuan (TW); Kelly Teng, Taipei (TW); Jui-Yu Lin, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 508 days.

(21) Appl. No.: 12/104,480

(22) Filed: Apr. 17, 2008

(65) Prior Publication Data

US 2009/0149099 A1 Jun. 11, 2009

(30) Foreign Application Priority Data

Dec. 6, 2007 (TW) ................. 96146503 A

(51) Int. Cl.
*C08G 63/42* (2006.01)
*C08G 63/08* (2006.01)

(52) U.S. Cl. ........ 528/297; 528/300; 528/301; 528/354; 525/408; 525/411; 525/437

(58) Field of Classification Search .................. 528/297, 528/354, 300, 301; 525/408, 411, 437
See application file for complete search history.

(56) References Cited

U.S. PATENT DOCUMENTS

| 5,359,026 A | 10/1994 | Gruber |
| 6,221,977 B1 | 4/2001 | Park et al. |
| 6,730,772 B2 | 5/2004 | Shastri |

FOREIGN PATENT DOCUMENTS

| JP | 09031179 | 2/1997 |
| JP | 10-265555 | * 10/1998 |
| JP | 2001323052 | 11/2001 |
| JP | 2004231773 | 8/2004 |

OTHER PUBLICATIONS

"Syntheses of Poly(lactic acid)-Poly(ethylene glycol) Serial Biodegradable Polymer Materials via Direct Melt Polycondensation and Their Characterization" Wang et al.; Journal of Applied Polymer Science, vol. 102, 577-587 (2006).

* cited by examiner

*Primary Examiner* — Milton I Cano
*Assistant Examiner* — Gennadiy Mesh
(74) *Attorney, Agent, or Firm* — Thomas|Kayden

(57) ABSTRACT

A method of preparing an aliphatic copolyester by mixing a first compound defined by the equation:

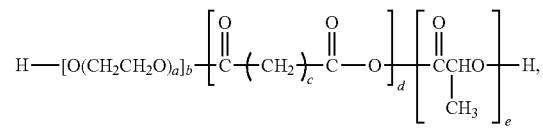

and a catalyst, and adding a second compound defined by

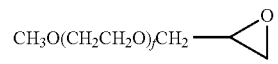

and a lactide, wherein the second compound and the lactide have a total weight less than the first compound, wherein a is 10-230, b, d and e have a ratio of 10-35:10-35:80-30, c is 1-4, and f is 1-10. The method further adds the second compound and the lactide, wherein the second compound and the lactide have a total weight less than the first compound, the second compound and the lactide in the prior mixing step. The method further adds the second compound and the lactide, wherein the second compound and the lactide have a total weight less than the first compound, the second compound and the lactide in of the prior mixing steps.

3 Claims, No Drawings

ALIPHATIC COPOLYESTERS AND METHOD OF PREPARING THE SAME

CROSS-REFERENCE TO RELATED APPLICATION

The present application claims the benefit of Taiwan Application No. 96146503, filed Dec. 6, 2007.

BACKGROUND OF THE INVENTION

1. Field of the Invention

The invention relates to a copolymer, and in particular to an aliphatic copolyester and preparation method thereof.

2. Description of the Related Art

Lactic acid monomer is isolated from fermented corn. Biodegradable polylactic acid (PLA) polymerized by lactic acid is a prospective and important environmental protection material, capable of application to various fields, for example, biomedicine, agriculture, fishery, plastic and textile industry. The water absorption rate of polylactic acid fiber is 0.6% lower than nylon fiber (4.5%), similar to polyesters such as polyethylene terephthalate (PET) (0.4%). The water absorption rate or hydrophilicity affects decomposition rate thereof. Higher hydrophilicity results in faster decomposition rate. Additionally, other products, for example, a drug delivery carrier, tissue engineering material or agricultural packaging, require using hydrophilic polylactic acid. For textiles, higher hydrophilicity brings better comfort. Thus, improvement of hydrophilicity of polylactic acid is desirable to meet future requirements of various product fields.

Hydrophilic polyethylene glycol (PEG) has been approved by the FDA for usage in the human body. Hydrophilicity of polylactic acid can be improved by conduction of PEG thereinto. Additionally, due to residual solvent and cost considerations, the non-solvent melt fabrication method is the current raw material polymerization technique. JP. Pat. 09-031179 discloses mixing polylactic acid and PEG. However, mixture leakage and phase separation occur because of deteriorated compatibility between polylactic acid and PEG. JP. Pat. 2004-231773 and 2001-323052 disclosing copolymerization of hydrophilic PEG and lactide to prepare a hydrophilic polylactic acid copolymer can overcome the aforementioned drawback. First, lactic acid and PEG are polycondensed to prepare a low-molecular-weight hydrophilic lactic acid copolymer containing PEG located at a main chain thereof, with a molecular weight of 600-10,000 g/mole. The hydrophilic oligomer and lactide are then copolymerized by ring-open polymerization to prepare a diblock or triblock lactic acid copolymer containing PEG located at the main chain thereof. However, the product contains high-molecular-weight block polylactic acid, bearing inherent drawbacks of polylactic acid.

Adding catalyst to polycondensation of lactic acid and PEG to prepare an alternative hydrophilic lactic acid copolymer containing PEG located at main chain thereof taught by Z. Y. Wang can overcome the aforementioned drawback. However, the molecular weight of the product is merely 41,000 g/mole. To achieve practical requirement, the molecular weight thereof must be increased. Additionally, U.S. Pat. Nos. 5,359,026 and 6,730,772 disclose ring-open polymerization of hydrophobic peroxide monomer and lactide to prepare a high-molecular-weight polylactic acid copolymer containing the hydrophobic monomer located at a side chain thereof, with a molecular weight exceeding 150,000 g/mole. However, it is difficult to perform melt copolymerization by directly mixing hydrophobic lactide and a hydrophilic monomer with a molecular weight exceeding 200 g/mole. U.S. Pat. No. 6,221,977 discloses ring-open polymerization of lactide and a hydrophilic monomer with a molecular weight exceeding 200 g/mole to prepare a high-molecular-weight polylactic acid copolymer containing the hydrophilic monomer located at a side chain thereof, with a molecular weight exceeding 150,000 g/mole. However, the spinning rate of the product is low (less than 800 m/min) in spinning tests. Additionally, after the polylactic acid copolymer is purified by the solvent precipitation method, the hydrophilic PEG content of the polylactic acid with a molecular weight exceeding 100,000 g/mole is less than 0.7 wt %. Most of hydrophilic PEG locates at the oligomer with a molecular weight less than 50,000 g/mole.

BRIEF SUMMARY OF THE INVENTION

One embodiment of the invention provides an aliphatic copolyester prepared by polymerization of a first compound having formula I, a second compound having formula II and a lactide:

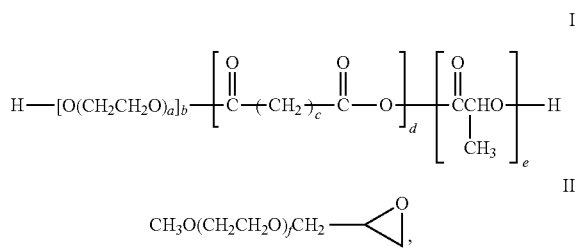

wherein a is 10-230, b, d and e have a ratio of 10-35:10-35:80-30, c is 1-4, and f is 1-10.

One embodiment of the invention provides a method of preparing an aliphatic copolyester comprising (a) mixing the disclosed first compound and a catalyst and adding the disclosed second compound and lactide, wherein the second compound and lactide have a total weight less than the first compound, (b) adding the disclosed second compound and lactide, wherein the second compound and lactide have a total weight less than the first compound, second compound and lactide in step (a), (c) adding the disclosed second compound and lactide, wherein the second compound and lactide have a total weight less than the first compound, second compound and lactide in steps (a) and (b), (d) adding the disclosed second compound and lactide, wherein the second compound and lactide have a total weight less than the first compound, second compound and lactide in steps (a), (b) and (c), and repeating step (d) to prepare an aliphatic copolyester.

One embodiment of the invention provides a melt-blown nonwoven comprising the disclosed aliphatic copolyester.

One embodiment of the invention provides a fiber woven fabric comprising the disclosed aliphatic copolyester.

A detailed description is given in the following embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides an aliphatic copolyester prepared by polymerization of a first compound having formula I, a second compound having formula II and a lactide.

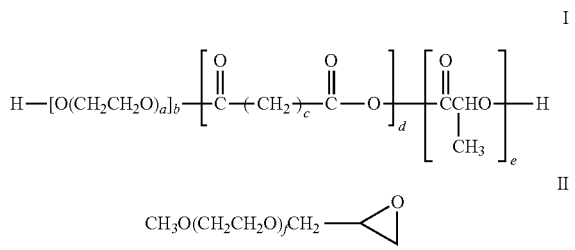

In formulae I and II, a may be 10-230, b, d and e have a ratio of about 10-35:10-35:80-30, c may be 1-4, and f may be 1-10.

The first compound has a molecular weight of about 3,000-30,000 g/mole or 3,000-10,000 g/mole. The aliphatic copolyester may be prepared by melt ring-open polymerization divided into, for example, a batch type fabrication or a continuous type fabrication. The aliphatic copolyester has a molecular weight of about 10,000-250,000 g/mole or 10,000-120,000 g/mole.

One embodiment of the invention provides a copolymer comprising a hydrophobic chain, a hydrophilic chain and a polymer chain. The polymer chain is compatible with the hydrophobic chain and the hydrophilic chain.

The hydrophilic chain may locate at the main chain and side chain of the copolymer. The hydrophobic chain is polylactic acid. The hydrophilic chain contains poly ethylene glycol.

The polymer chain (compatibilizer) is similar to the hydrophobic chain and the hydrophilic chain, for example, the polymer chain's main chain or side chain contains polyethylene oxide (PEO) so that the polymer chain is compatible with the hydrophobic chain and the hydrophilic chain.

Additionally, the compatibilizer leakage is overcome due to formation of chemical bonding between the compatibilizer and the copolymer.

The high-molecular-weight polylactic acid copolymer having a molecular weight exceeding 100,000 g/mole and comprising polyethylene glycol (PEG)-containing hydrophilic monomers may be utilized in melt spinning fabrication (with spinning rate exceeding 2,000 m/min).

One embodiment of the invention provides a method of preparing an aliphatic copolyester comprising (a) mixing the disclosed first compound and a catalyst and adding the disclosed second compound and lactide, wherein the second compound and lactide have a total weight less than the first compound, (b) adding the disclosed second compound and lactide, wherein the second compound and lactide have a total weight less than the first compound, second compound and lactide in step (a), (c) adding the disclosed second compound and lactide, wherein the second compound and lactide have a total weight less than the first compound, second compound and lactide in steps (a) and (b), (d) adding the disclosed second compound and lactide, wherein the second compound and lactide have a total weight less than the first compound, second compound and lactide in steps (a), (b) and (c), and repeating step (d) to prepare an aliphatic copolyester.

The catalyst may comprise organic metal compounds of tin, zirconium, aluminum or titanium. In step (a), the catalyst has a weight ratio of about 0.1-1.0 parts by weight, based on 100 parts by weight of the first compound.

One embodiment of the invention provides a method of preparing a copolymer comprising mixing a hydrophobic chain, a hydrophilic chain and a polymer chain to prepare a copolymer containing the hydrophobic chain, the hydrophilic chain and the polymer chain by ring-open polymerization (melt polymerization). The polymer chain is compatible with the hydrophobic chain and the hydrophilic chain.

The hydrophobic chain and the hydrophilic chain have a weight ratio of about 98:2-80:20. The weight ratio of the hydrophobic chain and the hydrophilic chain to the polymer chain is about 1:5-5:1. The polymerization temperature is about 140° C.-240° C. The copolymer has a molecular weight of about 30,000-200,000 g/mole.

In the melt polymerization, a catalyst is further added to promote reaction. The catalyst may comprise tin, zirconium, aluminum or titanium, having a weight ratio of about 1-0.05 parts by weight, based on 100 parts by weight of the reactant.

The copolymer containing the hydrophobic chain and the hydrophilic chain is prepared by ring-open polymerization comprising mixing a hydrophobic lactic acid monomer, a hydrophilic ethylene glycol monomer, an oligomer compatible with the hydrophobic and hydrophilic monomers, and a catalyst to prepare a lactic acid copolymer containing hydrophobic polylactic acid and hydrophilic polyethylene glycol located at the main chain and side chain thereof, effectively increasing water absorption rate of polylactic acid.

One embodiment of the invention provides a melt-blown nonwoven comprising the disclosed aliphatic copolyester. The nonwoven has strength of about 0.5-2.5 kg/5 cm, a diameter of about 1-20 cm and a basis weight exceeding or equal to 50 g/m$^2$.

One embodiment of the invention provides a fiber woven fabric comprising the disclosed aliphatic copolyester. The fiber woven fabric has strength of about 2-4 g/d, a filament diameter of about 1-5 dpf and elongation of 30-60%.

EXAMPLES

CH$_3$PEG-Epoxide (formula II) was synthesized by Isao Ikeda, disclosed in J. of Applied polymer Science, Vol. 42, 2871-2877 (1991).

Monomer content of copolymer was calculated by relative integral values of $^1$HNMR. For example, $^1$HNMR (ppm)=3.4 representing CH$_3$O— absorption peak of CH$_3$PEG-Epoxide was used to calculate CH$_3$PEG-Epoxide content of copolymer.

Example 1

Polymer a (Formula I, Compatibilizer) Preparation 375 g lactic acid, 125 g polyethylene glycol (PEG) and 27 g adipic acid were polymerized by melt polymerization to prepare a 4,000 g/mole polymer a serving as a compatibilizer in Example 2. The polymerization temperature was 160° C.-180° C. The polymerization pressure was 100 mmHg. The polymerization time was 4 hours. The weight ratio of the polyethylene glycol (PEG) was 28 parts by weight, based on 100 parts by weight of the main chain of the polymer a. $^1$HNMR (d-chloroform, ppm): 5.1 (PLA); 3.6-3.7 (PEG); 2.3 (adipic acid); 1.5 (PLA); 1.4-1.1 (adipic acid).

Example 2

Polymer b (Hydrophilic Lactic Acid Copolymer) Preparation

First, 100 g polymer a and 0.1 g tetraoctanolyl tin were mixed. After 0.5 hour, 6 g CH$_3$PEG-Epoxide was added. After 0.5 hour, 94 g lactic acid was added (the first addition). After 0.5 hour, 12 g CH$_3$PEG-Epoxide was added. After 0.5 hour, 188 g lactic acid was added (the second addition). After 0.5 hour, 24 g CH$_3$PEG-Epoxide was added. After 0.5 hour, 376 g lactic acid was added (the third addition) to prepare a 14,800 g/mole polymer b with a yield of 95.7%, serving as a compatibilizer in Example 3. The polymerization temperature was 160° C. The feeder temperature was 150° C. The temperatures of the heating coils near to switch Were respectively 130° C., 150° C. and 170° C. The polymerization time was 4 hours. The weight ratio of the CH$_3$PEG-Epoxide was 4.8 parts by weight, based on 100 parts by weight of the side chain of the polymer b. Product analysis was recited in Table 1.

20 g polymer b was placed in 250 mL deionized water (25° C.) for 5 hours. After taking out and removal of water, polymer b was weighted and its water absorption amount was calculated. $^1$HNMR (d-chloroform, ppm): 5.1 (PLA); 3.6-3.7 (PEG); 3.4 (CH$_3$O— of CH$_3$PEG-Epoxide); 2.3 (adipic acid); 1.5 (PLA); 1.4-1.1 (adipic acid).

Example 3

Polymer c (Hydrophilic Lactic Acid Copolymer) Preparation

First, 100 g polymer b and 0.1 g tetraoctanolyl tin were mixed. After 0.5 hour, 6 g CH$_3$PEG-Epoxide was added. After 0.5 hour, 94 g lactic acid was added (the first addition). After 0.5 hour, 12 g CH$_3$PEG-Epoxide was added. After 0.5 hour, 188 g lactic acid was added (the second addition). After 0.5 hour, 24 g CH$_3$PEG-Epoxide was added. After 0.5 hour, 376 g lactic acid was added (the third addition) to prepare a 30,000 g/mole polymer c with a yield of 94.7%, serving as a compatibilizer in Example 4. The polymerization temperature was 155° C. The feeder temperature was 150° C. The temperatures of the heating coils near to switch were respectively 130° C., 150° C. and 170° C. The polymerization time was 4 hours. The weight ratio of the CH$_3$PEG-Epoxide was 4.2 parts by weight, based on 100 parts by weight of the side chain of the polymer c. Product analysis was recited in Table 1.

20 g polymer c was placed in 250 mL deionized water (25° C.) for 5 hours. After taking out and removal of water, polymer c was weighted and its water absorption amount was calculated. $^1$HNMR (d-chloroform, ppm): 5.1 (PLA); 3.6-3.7 (PEG); 3.4 (CH$_3$O— of CH$_3$PEG-Epoxide); 2.3 (adipic acid); 1.5 (PLA); 1.4-1.1 (adipic acid).

Example 4

Polymer d (Hydrophilic Lactic Acid Copolymer) Preparation

First, 100 g polymer c and 0.1 g tetraoctanolyl tin were mixed. After 0.5 hour, 6 g CH$_3$PEG-Epoxide was added. After 0.5 hour, 94 g lactic acid was added (the first addition). After 0.5 hour, 12 g CH$_3$PEG-Epoxide was added. After 0.5 hour, 188 g lactic acid was added (the second addition). After 0.5 hour, 24 g CH$_3$PEG-Epoxide was added. After 0.5 hour, 376 g lactic acid was added (the third addition) to prepare a 60,000 g/mole polymer d with a yield of 96%, serving as a compatibilizer in Example 5. The polymerization temperature was 155° C. The feeder temperature was 150° C. The temperatures of the heating coils near to switch were respectively 130° C., 150° C. and 170° C. The polymerization time was 4 hours. The weight ratio of the CH$_3$PEG-Epoxide was 2.6 parts by weight, based on 100 parts by weight of the side chain of the polymer d. Product analysis was recited in Table 1.

20 g polymer d was placed in 250 mL deionized water (25° C.) for 5 hours. After taking out and removal of water, polymer d was weighted and its water absorption amount was calculated. $^1$HNMR (d-chloroform, ppm): 5.1 (PLA); 3.6-3.7 (PEG); 3.4 (CH$_3$O— of CH$_3$PEG-Epoxide); 2.3 (adipic acid); 1.5 (PLA); 1.4-1.1 (adipic acid).

Example 5

Polymer e (Hydrophilic Lactic Acid Copolymer) Preparation

First, 100 g polymer d and 0.1 g tetraoctanolyl tin were mixed. After 0.5 hour, 3 g CH$_3$PEG-Epoxide was added. After 0.5 hour, 94 g lactic acid was added (the first addition). After 0.5 hour, 6 g CH$_3$PEG-Epoxide was added. After 0.5 hour, 188 g lactic acid was added (the second addition). After 0.5 hour, 12 g CH$_3$PEG-Epoxide was added. After 0.5 hour, 376 g lactic acid was added (the third addition) to prepare a 79,000 g/mole polymer e with a yield of 96%. The polymerization temperature was 155° C. The feeder temperature was 150° C. The temperatures of the heating coils near to switch were respectively 130° C., 150° C. and 170° C. The polymerization time was 4 hours. The weight ratio of the CH$_3$PEG-Epoxide was 2.1 parts by weight, based on 100 parts by weight of the side chain of the polymer e. Product analysis was recited in Table 1.

20 g polymer e was placed in 250 mL deionized water (25° C.) for 5 hours. After taking out and removal of water, polymer e was weighted and its water absorption amount was calculated. $^1$HNMR (d-chloroform, ppm): 5.1 (PLA); 3.6-3.7 (PEG); 3.4 (CH$_3$O— of CH$_3$PEG-Epoxide); 2.3 (adipic acid); 1.5 (PLA); 1.4-1.1 (adipic acid).

Comparative Example 1

Polymer f (Lactic Acid Copolymer) Preparation

First, 0.1 g tetraoctanolyl tin and 6 g CH$_3$PEG-Epoxide were mixed. After 0.5 hour, 94 g lactic acid was added (the first addition). After 0.5 hour, 12 g CH$_3$PEG-Epoxide was added. After 0.5 hour, 188 g lactic acid was added (the second addition). After 0.5 hour, 24 g CH$_3$PEG-Epoxide was added. After 0.5 hour, 376 g lactic acid was added (the third addition) to prepare a 82,000 g/mole polymer f with a yield of 98%. The polymerization temperature was 155° C. The feeder temperature was 150° C. The temperatures of the heating coils near to switch were respectively 130° C., 150° C. and 170° C. The polymerization time was 4 hours. The weight ratio of the CH$_3$PEG-Epoxide was less than 0.5 parts by weight, based on 100 parts by weight of the side chain of the polymer f. Product analysis was recited in Table 1.

20 g polymer f was placed in 250 mL deionized water (25° C.) for 5 hours. After taking out and removal of water, polymer f was weighted and its water absorption amount was calculated. $^1$HNMR (d-chloroform, ppm): 5.1 (PLA); 3.6-3.7 (PEG); 3.4 (CH$_3$O— of CH$_3$PEG-Epoxide); 2.3 (adipic acid); 1.5 (PLA); 1.4-1.1 (adipic acid).

TABLE 1

|  | Example 2 | Example 3 | Example 4 | Example 5 | Comparative Example 1 |
|---|---|---|---|---|---|
| Compatibilizer | Polymer a | Polymer b | Polymer c | Polymer d | — |
| Polymerization temperature (° C.) | 160 | 155 | 155 | 155 | 155 |
| Polymerization time (hour) | 4 | 4 | 4 | 4 | 4 |
| Lactic acid + PEG (g) (the first addition) | 94 + 6 = 100 | 94 + 6 = 100 | 94 + 6 = 100 | 94 + 3 = 97 | 94 + 6 = 100 |
| Lactic acid + PEG (g) (the second addition) | 94 × 2 + 6 × 2 = 200 | 94 × 2 + 6 × 2 = 200 | 94 × 2 + 6 × 2 = 200 | 94 × 2 + 3 = 194 | 94 × 2 + 6 × 2 = 200 |
| Lactic acid + PEG (g) (the third addition) | 94 × 4 + 6 × 4 = 400 | 94 × 4 + 6 × 4 = 400 | 94 × 4 + 6 × 4 = 400 | 94 × 4 + 6 × 2 = 388 | 94 × 4 + 6 × 4 = 400 |
| Lactic acid + PEG (g) (total weight) | 700 | 700 | 700 | 679 | 700 |
| Mw of polymer | Polymer b, 14,800 | Polymer c, 30,000 | Polymer d, 60,000 | Polymer e, 79,000 | Polymer f, 82,000 |
| PEG content of side chain of polymer (wt %) [*] | 4.8 | 4.2 | 2.6 | 2.1 | <0.7 |
| Total PEG content of polymer (wt %) | 5.2 | 4.3 | 2.7 | 2.4 | <0.5 |
| Water absorption rate (wt %) | 64 | 57 | 54 | 51 | 46 |
| Hydrolysis rate (Mw ratio, after test/before test) (%) | 13 | 20 | 35 | 37 | 45 |

[*] The precipitated polymer product acquired by the solvent precipitation.

Example 6

Melt-Blown Nonwoven Test

The melt-blown nonwoven was prepared by polymer d. The melt-blown nonwoven test was performed at a spinning temperature of 180° C.-240° C. The melt-blown nonwoven had strength of 2.0 kg/5 cm, a diameter of 2-10 μm and a basis weight exceeding or equal to 50 g/m².

Example 7

Fiber Woven Fabric Test

The fiber woven fabric was prepared by polymer d. The fiber woven fabric test was performed at a spinning temperature of 180° C.-240° C. and a spinning rate of 1,000-3,000 m/min. The spinning rate achieved 2,000 m/min. The fiber woven fabric had a filament diameter of 1-5 dpf, strength of 2-4 g/d and elongation of 30-60%.

Comparative Example 2

The preparation is similar to Comparative Example 1. The product, however, was formed without solvent precipitation. The melt-blown nonwoven test was then performed as Example 6. The melt-blown nonwoven had strength less than 0.5 kg/5 cm and a diameter of 10-20 μm.

Comparative Example 3

The preparation is similar to Comparative Example 1. The product, however, was formed without solvent precipitation. The fiber woven fabric test was then performed as Example 7. The spinning rate was less than 800 m/min. The fiber woven fabric had a filament diameter of 3.0-5.5 dpf, strength of 0.8-1.2 g/d and elongation of 20-80%.

The PEG contents of the side chains of polymers b-e synthesized by Examples 2-5 are greater than that of polymer f synthesized by Comparative Example 1 due to addition of compatibilizer such that the lactic acid copolymers containing hydrophilic side chains are formed, thereby improving water absorption rate thereof. Compared with Examples 5-6 and Comparative Examples 2-3, the hydrophilic lactic acid copolymer of the invention provides higher spinnability than conventional materials.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of preparing an aliphatic copolyester, comprising:

(a) mixing a first compound defined by

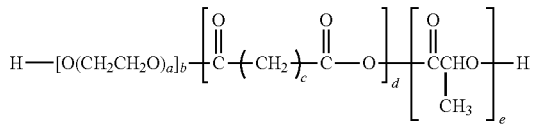

and a catalyst, and adding a second compound defined by

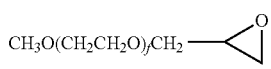

and a lactide, wherein the second compound and the lactide have a total weight less than the first compound, wherein a is 10-230, b, d and e have a ratio of 10-35:10-35:80-30, c is 1-4, and f is 1-10;

(b) adding the second compound and the lactide, wherein the second compound and the lactide have a total weight less than the first compound, the second compound and the lactide in step (a);

(c) adding the second compound and the lactide, wherein the second compound and the lactide have a total weight less than the first compound, the second compound and the lactide in steps (a) and (b);

(d) adding the second compound and the lactide, wherein the second compound and the lactide have a total weight less than the first compound, the second compound and the lactide in steps (a), (b) and (c).

2. The method of preparing an aliphatic copolyester as claimed in claim 1, wherein the catalyst comprises organic metal compounds of tin, zirconium, aluminum or titanium.

3. The method of preparing an aliphatic copolyester as claimed in claim 1, wherein the catalyst has a weight ratio of 0.1-1.0 parts by weight, based on 100 parts by weight of the first compound in step (a).

* * * * *